United States Patent [19]

Denneau et al.

[11] Patent Number: 5,566,342
[45] Date of Patent: Oct. 15, 1996

[54] SCALABLE SWITCH WIRING TECHNIQUE FOR LARGE ARRAYS OF PROCESSORS

[75] Inventors: Monty M. Denneau, Brewster; Donald G. Grice, Kingston; Peter H. Hochschild, New York, all of N.Y.; Craig B. Stunkel, Bethel, Conn.

[73] Assignee: International Business Machines Corporation, Armonk, N.Y.

[21] Appl. No.: 298,828

[22] Filed: Aug. 31, 1994

[51] Int. Cl.$^6$ .................................................. G06F 13/00
[52] U.S. Cl. ............. 395/800; 395/200.02; 364/DIG. 1; 364/228.3; 364/229; 364/240.7
[58] Field of Search ................................. 395/800, 200.2, 395/311; 370/60, 94.1, 94.3, 86

[56] References Cited

U.S. PATENT DOCUMENTS

| | | | |
|---|---|---|---|
| 4,215,401 | 7/1980 | Holsztynski et al. | 364/515 |
| 4,639,857 | 1/1987 | McCanny et al. | 364/754 |
| 4,780,873 | 10/1988 | Mattheyses | 370/94 |
| 4,797,882 | 1/1989 | Maxemchuk | 370/94 |
| 4,991,171 | 2/1991 | Teraslinna et al. | 370/94.1 |
| 5,189,414 | 2/1993 | Tawara | 370/94.3 |
| 5,226,125 | 7/1993 | Balmer et al. | 395/325 |
| 5,331,642 | 7/1994 | Valley et al. | 371/5.2 |
| 5,331,643 | 7/1994 | Smith | 371/22.3 |
| 5,333,271 | 7/1994 | Fredericks et al. | 395/200 |
| 5,345,556 | 9/1994 | Zapisek | 395/200 |

FOREIGN PATENT DOCUMENTS

WO89/09967 7/1989 WIPO .

OTHER PUBLICATIONS

Class of Rearrangeable Switching Networks; D. C. Opferman et al., 1971, Bell System Technical Journal, pp. 1579–1618.
Performance of Processor–Memory Interconnections for Multiprocessors, J. H. Patel, IEEE Transactions on Computers, vol. 30, No. 10, Oct. 1981, pp. 771 to 780.
Cost–Performance Bounds for Microcomputer Networks, D. Read and H. Schvetman, IEEE Transactions on Computers, vol. 32, No. 1, Jan. 1983 pp. 83 to 95.
Multicomputer Networks, Message–Based Parallel Processing, by D. A. Reed and R. M. Fujimoto, The MIT Press, 1987, pp. 42 to 46.
Routing Techniques for Rearrangeable Interconnection Networks by Chow et al., copyright 1980, IEEE, pp. 64–65.
Generalized Connection Networks for Parallel Processor Intercommunication by C. D. Thompson, IEEE Transactions on Computers, vol. C–27, No. 12, Dec. 1978, pp. 1119 to 1125.
Routing Schemes for the Augmented Data Manipulator Network in an MIMD System, IEEE Transactions on Computers, vol. C–31, No. 12, Dec. 1992, pp. 1202 to 1214.
The Indirect Binary N–Cube Microprocessor Array by M. Pease, IEEE Transactions on Computers 1977, vol. C–26, No. 5, pp. 458 to 473.
Ralph Duncan, "A Survey of Parallel Computer Architectures", IEEE Computer, Feb. 1990, pp. 5–16.
De Groot et al, "Image Processing Using The Sprint Multiprocessor", IEEE Conference Paper (Cat. No. 89CH2767–2), Aug. 1989, pp. 173–176.

Primary Examiner—Mehmet B. Geckil
Attorney, Agent, or Firm—Robert P. Tassinari, Jr.

[57] ABSTRACT

Connections between the node switch sets associated with processors in large scalable processor arrays, such as those of the butterfly variety, are arranged, like the 2-D mesh array, in rows and columns between the node switch sets. Additional sets of switches called pivot switch sets are used to accomplish this. They are added to the processors and the processor switch sets to form processor clusters. The clusters are each assigned a logical row and column location in an array. Each pivot switch set is connected to all node switch sets in the same assigned column location and to all node switch sets in the same assigned row location as the pivot set. Consequently, any two node switch sets are connected by way of a pivot set located at either (a) the intersection row of the first node set and the column of the second node set or at (b) the intersection of the column of the first node set and the row of the second node set.

11 Claims, 7 Drawing Sheets

SCALABLE SWITCH WIRING TECHNIQUE FOR LARGE ARRAYS OF PROCESSORS

BACKGROUND OF THE INVENTION

1. Field of the Invention

The invention relates to intercommunication networks for use in parallel processing systems and more particular to interconnection networks suited for use in massively parallel processing systems.

2. Description of the Prior Art

In general, distributed processing involves extending a processing load across a number of separate processors, with some type of interconnection scheme being used to couple all of the processors together in order to facilitate message passing and data sharing. Many variants of distributed processing architectures exist. Some entail use of only a relatively small number of interconnected processors, typically two and often less than ten, separate highly sophisticated central processing units as would be used in a traditional mainframe or super-mini-computer. These processors can be interconnected either directly through an interprocessor bus, or indirectly through a multi-ported shared memory. By contrast, massively parallel processing systems involve a relatively large number, often in the hundreds or even thousands, of separate microprocessor-based processing elements that are interconnected in a network by high speed switches in which each such processing element is at a separate node in the network. In operation, the network routes messages, typically in the form of packets, from any one of these nodes to another to provide communication therebetween. The present invention is directed to the manner of interconnecting the switches in such networks of massively parallel processing systems.

The overall performance of a massively parallel processing system can be heavily constrained by the performance of the underlying network. Generally speaking, if the network is too slow and particularly to the point of adversely affecting overall system throughout, it sharply reduces the attractiveness of using a massively parallel processing system.

Given the substantial number of processing elements that is generally used within a typical massively parallel processing system and the concomitant need for any one element in this system to communicate at any one time with any other such element, the network must also be able to simultaneously route a relatively large number of messages among the processing elements. One problem in communication is the lack of paths available to accomplish the efficient transfer between the nodes. This problem can be understood by reference to FIG. 1 which shows a prior art "2-D Mesh" network with sixteen nodes.

As shown in FIG. 1, the nodes 1 each contain a processor 2 and a switch 3. The nodes are arranged in rows and columns and are connected to each of the adjacent nodes by bi-directional connections 4. Communication between nodes 1 is through the bi-directional connections 4 and the switches 3 in the nodes. While communication between processors in adjacent nodes can be quick and efficient, communication to separated nodes must pass through switches in a number of intermediate nodes. For instance, when the node in the top row of the leftmost column communicates with the node in the bottom row in the rightmost column, it must pass through five intermediate nodes. With all nodes in the array communicating at the same time, there can be insufficient links 4 to communicate all messages at the same time. The situation can be best illustrated by the case where each node in the two lefthand columns 5 in FIG. 1 wants to communicate a message with a different node in the two righthand columns 6. There are only four bi-directional paths 4a to communicate eight messages in this sixteen node array. The problem is worse in arrays with more nodes. As a result, a 2D mesh array is said not to "scale" well.

A more scalable network is a folded butterfly variety of multistage network. This type of network decreases the number of nodes that must be traversed between the most distanced processing nodes and provides redundant paths between each of the processing nodes. Like the 2-D mesh network, each node is associated with switches. However, there is more than one processor at a node and the switch sets have two stages. For the simple two processors per node 10 array shown in FIG. 2, the switch sets 12 are made of two four way switches 14 and 16. This arrangement permits either processor to communicate with the other in the source node through the switch 14 and with processors in other nodes through connections between switch sets. The cross-coupling between switch sets gives rise to the "butterfly" in the term folded butterfly array while "folded" in that term comes from the fact that the last column of processor nodes wraps around and is connected to the first column.

While the connections between switches in the 2D mesh arrangement shown in FIG. 1 are in orderly rows and columns, the interconnections 20 between the switch sets in folded butterfly arrays can be chaotic. In the simple system illustrated in FIG. 2, the diagonal cross-coupling of the wiring between nodes appears manageable but in larger arrays with hundreds and even thousands of processors the diagonal cross couplings between switch sets has given rise to what has been referred to as the "ball of wires" problem. In such systems, the wiring during assembly and the tracing of connections during servicing can be daunting.

BRIEF DESCRIPTION OF THE INVENTION

In accordance with the present invention, the connections between the node switch sets of large scalable processor arrays, such as those of the folded butterfly variety, are arranged, like the 2-D mesh array, along rows and columns between the node switch sets. Additional sets of switches called pivot switch sets are used so accomplish this. They are added to the processing nodes to form a processor cluster. The clusters are each assigned a logical row and column location in an array. Each pivot set is connected to all node sets in the same assigned column location and to all node sets in the same assigned row location as the pivot set. Consequently, any two node sets of switches are connected by way of a pivot set located at either (a) the intersection row of the first node set and the column of the second node set or at (b) the intersection of the column of the first node set and the row of the second node set.

Therefore it is the object of the present invention to simplify the connection of processors in multistage processor arrays.

It is a further object of the present invention to provide a logical arrangement of node switches and pivot switches for connecting the final stages in multi-shape processor arrays.

BRIEF DESCRIPTION OF THE DRAWINGS

The present invention can be readily understood from the following detailed description in conjunction wit the accompanying figures of which.

DETAILED DESCRIPTION

Figure 1:
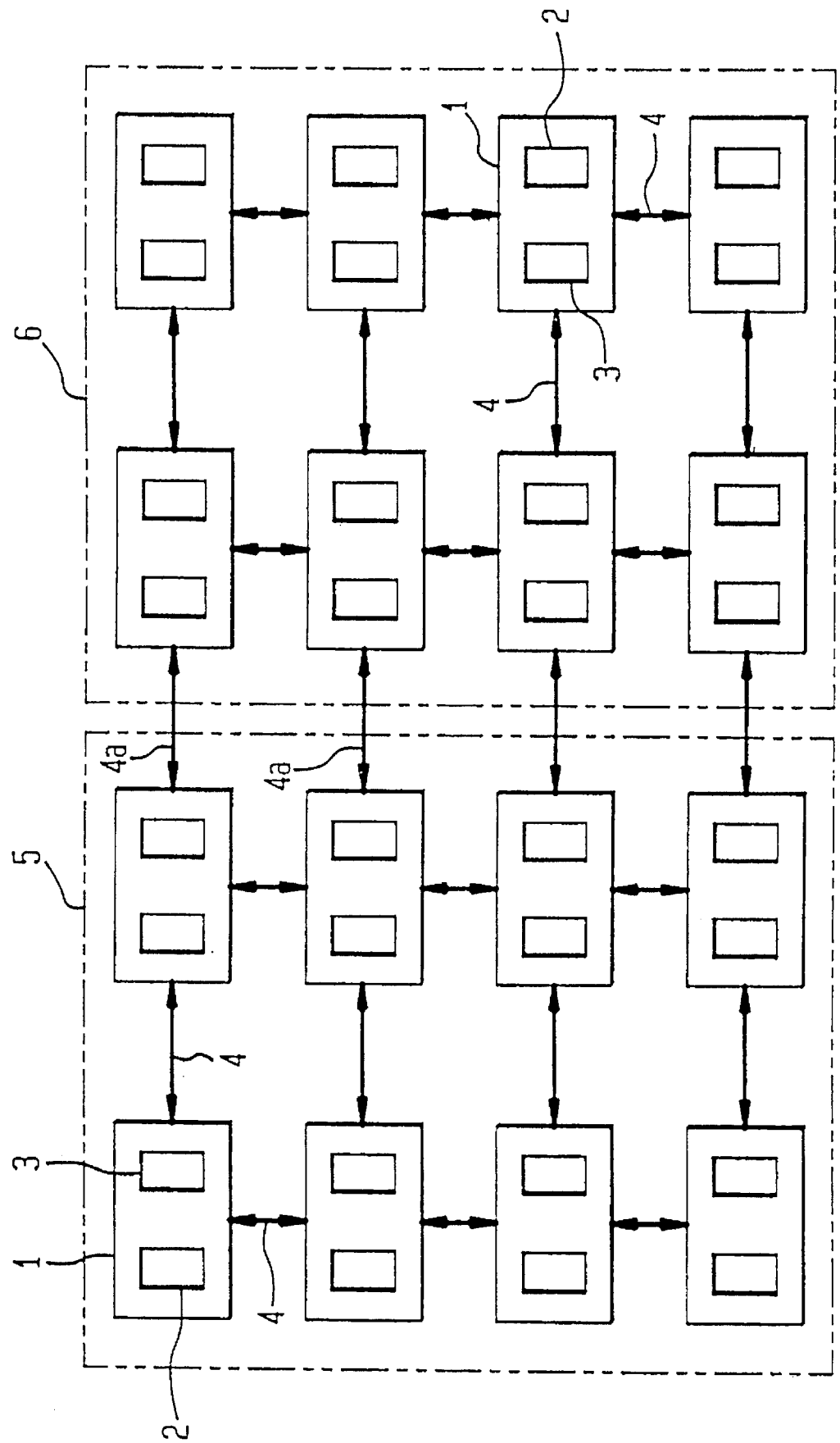
FIG. 1 is a block diagram of a prior art 2-D mesh array.
Figure 2:
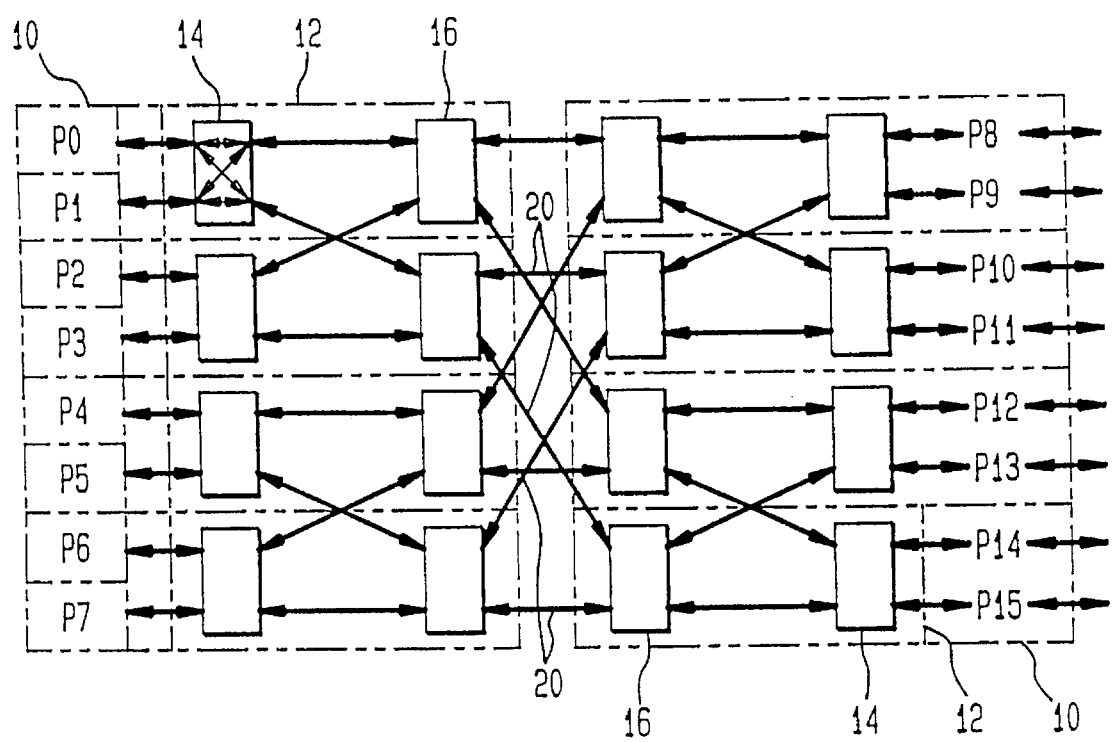
FIG. 2 is a block diagram of a prior art folded butterfly array.
Figure 3:
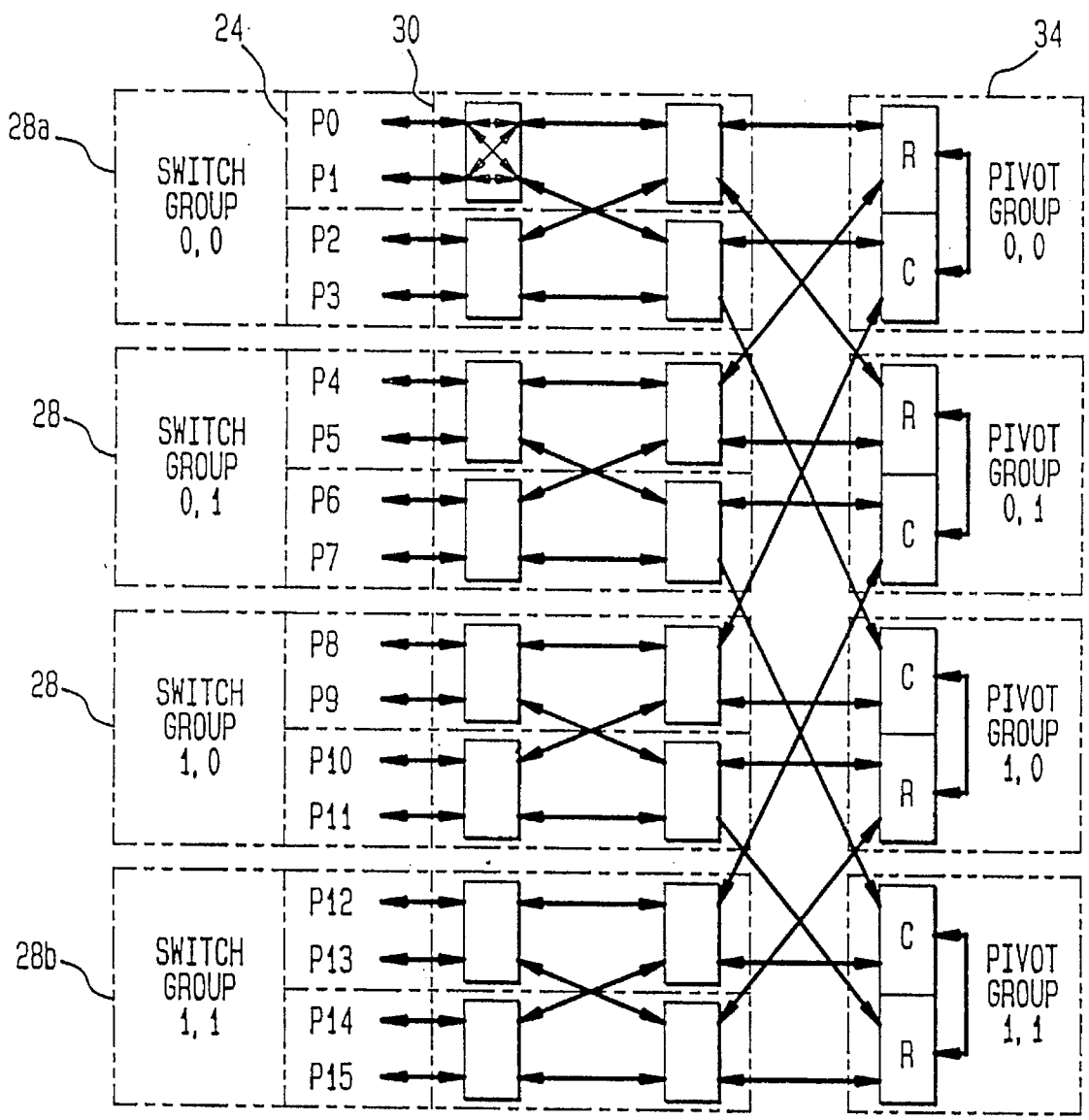
FIG. 3 is a functional layout of processor nodes and pivot nodes in one embodiment of the present invention.

Referring now to FIG. 3, the sixteen processors $P_0$ to $P_{15}$ arranged in 2 columns in FIG. 2 are shown as being in one column in this figure. Every two processing nodes 24 and 26 form a single switch group 28. With each switch group the is an associated pivot group 34 to form a processing cluster. In this simple case, the switches in the switch group are all simple four way switches. All communication between the switches in a switch group is through the switch groups set of switches 30 and 32. While all communication between different switch groups is conducted through a pivot group. Each switch group and pivot group in a processing cluster are assigned the same logical row and column address location. Thus switch group 28a and pivot group 34a are assigned location 0,0 where the first digit represents the column location of the switch group and the second digit represents the row location of the switch group. Likewise, the other groups are assigned locations proceeding in numerical order as you proceed down the column of switches in the group. This sequence is repeated until all the processing clusters have been numbered irrespective of the number of clusters involved.

Figure 4:
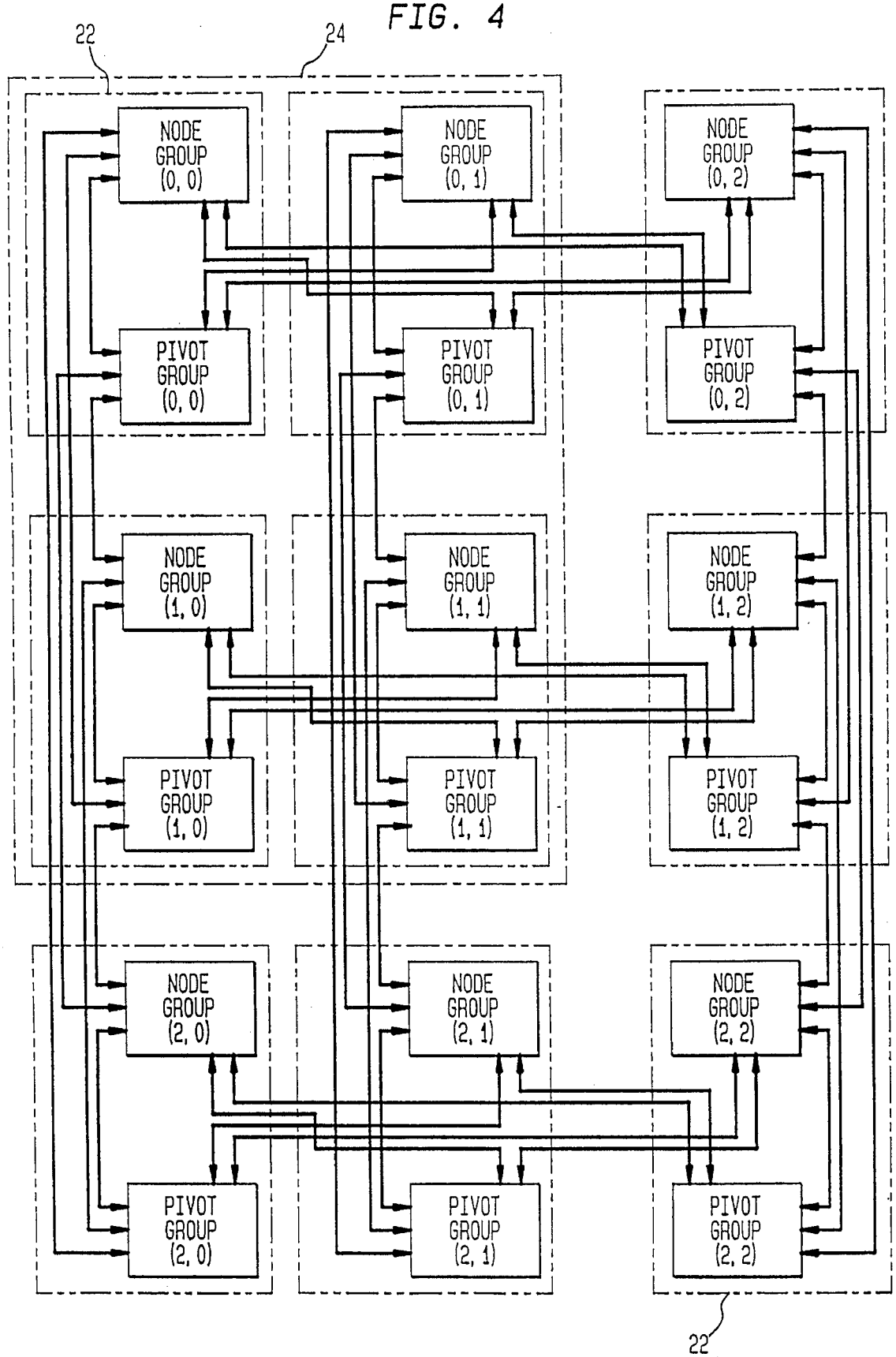
FIG. 4 is a wiring layout of processor clusters in a second embodiment of the present invention.

The groups are then arranged in columns and rows in accordance with their row and column numbers. A folded array containing nine processor clusters 22 arranged in three separate columns is shown in FIG. 4. Each pivot group is located adjacent to the node group with the same numerical cluster position. Then all of the node groups that have been assigned the same row address are connected to all the pivot groups with that row address. While each node groups assigned the same column address are connected to all the pivot groups with that column address. There are no node group to node group connections nor are there any pivot group to pivot group connections. With this arrangement, communication between any two node groups is always through a pivot group. There is no direct node group to node group communication. Nor is there any pivot group to pivot group communication. As shown in FIG. 4, all node groups are operationally separated from all other node groups in the illustrated array by only one pivot group. Furthermore, all array connections are along row and column paths. In addition there are redundant paths between each of the node groups.

Figure 5:
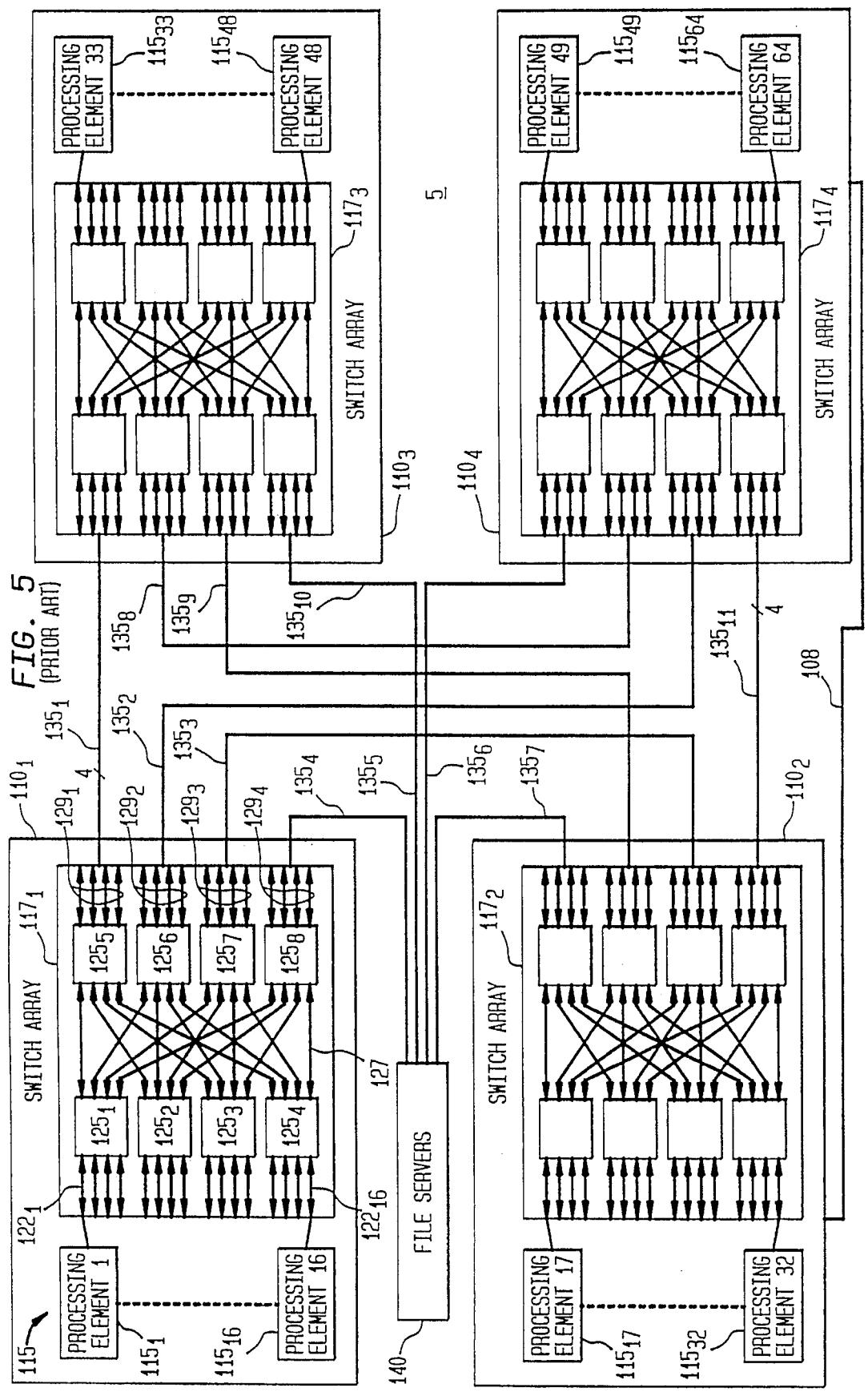
FIG. 5 is a prior art array of a scalable parallel processing system.

FIG. 5 depicts a very high level simplified block diagram of actual prior art scalable parallel processing system. This system is the 9076 SP-1 system of International Business Machines (IBM) Corporation of Armonk, N.Y.

To the extent relevant, the system contains sixty-four separate processing elements 115. All of these processing elements operate in parallel with each of these elements performing a distinct portion of a given application. In order for each of these elements to perform its individual processing task, that element communicates with other processing elements through high speed bi-directional packet network 108, and specifically transfers application data through packet messages with other such elements, as the application requires. In that regard, each processing element undertakes its associated application processing upon receipt of the needed data from other processing elements and then communicates the results of that processing onward to another processing element(s), again by packet messages, for subsequent use therein.

As shown, the system is organized into four separate processing nodes, each of which contains sixteen separate processing elements 115 connected to corresponding nodes of a 16-by-16 bi-directional packet switch array. Specifically, processing nodes $110_1$, $110_2$, $110_3$ and $110_4$ each contain switch arrays $117_1$, $117_2$, $117_3$ and $117_4$ which are connected to processors $115_{16}$, $115_{17}$, $115_{32}$ and $115_{33}$, . . . , $115_{48}$; and $115_{49}$, . . . , $115_{64}$, respectively. All four packet switch arrays $117_1$, $117_2$, $117_3$ and $117_4$ are themselves interconnected through leads 135 to implement packet network 108. In that regard, arrays $117_1$, and $117_2$, $117_1$ and $117_3$, $117_1$ and $117_4$, $117_2$ and $117_4$, and $117_3$ and $117_4$ are interconnected through respective leads $135_3$, $135_1$ $135_2$, $135_{11}$ and $135_8$. In addition, file server 140, which is conventional and well known in the art, is coupled, for packet communication, through leads 135, specifically leads $135_4$, $135_5$, $135_6$, and $135_7$ to the switch arrays within respective processing nodes $110_1$, $110_3$, $110_4$ and $110_2$ in order to write (download) a desired file into any processing element for subsequent use thereat or to receive (upload) and subsequently store a file from any processing element.

Inasmuch as all of the processing nodes are identical, then, for purposes of brevity, the following discussion will only address cluster $110_1$. This cluster contains sixteen separate processing elements, all of which are identical. Each of these processing elements is microprocessor based and specifically contains a reduced instruction set (RISC) microprocessor, such as preferably a RS/6000 type microprocessor manufactured by the IBM Corporation, and associated memory, input/output (I/O) and supporting circuitry. Since the circuitry of each of these elements has essentially no bearing on the invention it will not be discussed in any greater detail.

Each processing element, such as illustratively elements $115_1$ and $115_{16}$, can communicate on a bi-directional basis through bi-directional switch array $117_1$ and hence through packet network 108 with any other such element or the file server. In doing so, each of these elements is connected through a pair of half-duplex links to a corresponding input port (also hereinafter referred to as a "receiver") of an 8-by-8 port bi-directional switching circuit located within this switch array. Switch array $117^1$ contains eight separate identical 8-by-8 switching circuits 125 (specifically circuits $125_1$, $125_2$, $125_3$, $125_4$, $125_5$, $125_6$, $125_7$ and $125_8$) interconnected through leads 127. Each of these switching circuits, routes packets from any of eight input ports to any of eight output ports. As such, the inter-connected switching circuits situated within switch array $117_1$ implement a bi-directional 16-by-16 packet switch. To simplify the drawing, each pair of half-duplex lines that connects to each processing element is shown as a single full-duplex line, such as lines $122_1$ and $122_{16}$ that respectively link processing elements $115_1$ and $115_{16}$ to switching circuits $125^1$ and $125_4$.

Operationally speaking, each processing element, such as element $115_1$, that desires to send a packet (i.e.., an "originating" element) to another processing element (i.e., a "destination" element), such as element $115_{33}$, first assembles a packet, to contain appropriate fields, including a routing code field. The routing code is formed of a number of successive groups of three-bit values, packed two groups per byte, with each group designating an output port address within a given 8-by-8 switching circuit. In practice, a number of such switching circuits are serially connected to implement successive routing stages. The number of such three-bit groups is governed by the number of successive routing stages, i.e., successive inter-connected individual switching circuits, used within the network. As each packet is routed through a given stage and that stage examines the most significant three-bit group to discern the specific output port for that packet and then discards this group and shortens that packet accordingly. Accordingly, the next three-bit group becomes the most significant group for use by the next successive routing stage, and so forth. Details of the switches and the routing code can be found in patent application serial #27906 (KI9-93-003) filed Mar. 4, 1993, and entitled "A General Shared Queue Based Time Multiplexed Packet Switch with Deadlock Avoidance", which application is hereby incorporated by reference.

Figure 6:
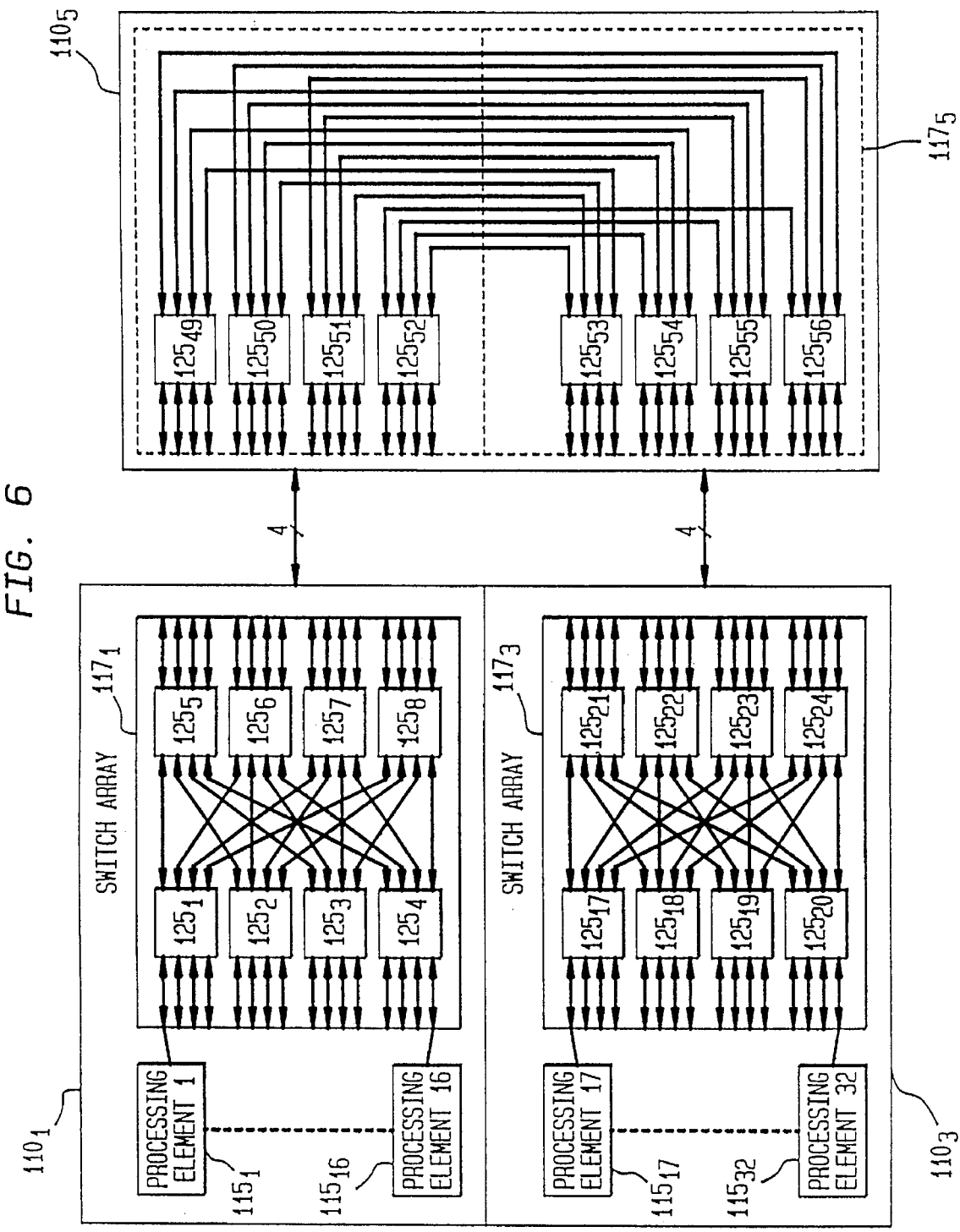
FIG. 6 is a diagram of a processing cluster using the switches of FIG. 5.

Referring now to FIG. 6, it can be seen how the processing nodes 110 in FIG. 5 are connected in accordance with the present invention. Processor nodes $110_1$ and $110_3$ are joined by a pivot group $110_5$ to form a processing cluster. The pivot group contains a switch $117_5$ which is identical to the switches $117_1$ and $117_3$. The switch $117_3$ is shown unfolded so that the pivot group $110_5$ connects processor node $110_1$ to processor node $110_3$.

There is at least one connection between the pivot node $110_5$ and each of the processor nodes $110_1$ and $110_3$. In the 128 processor array of FIG. 7, there are four connections between the pivot group and the two nodes in each cluster shown in FIG. 6. The remaining connections are to the other clusters making up the 128 cluster array. In FIG. 6 all connections between the processor nodes $110_1$ and $110_2$ is through the pivot node $110_5$. Communication always goes through both halves of the pivot switch in one direction or another. Likewise, in FIG. 7 all communication between the groups of processor clusters is through a pivot switch group. There is no direct pivot group to pivot group connection nor is there any direct processor group to processor group connection.

Figure 7:
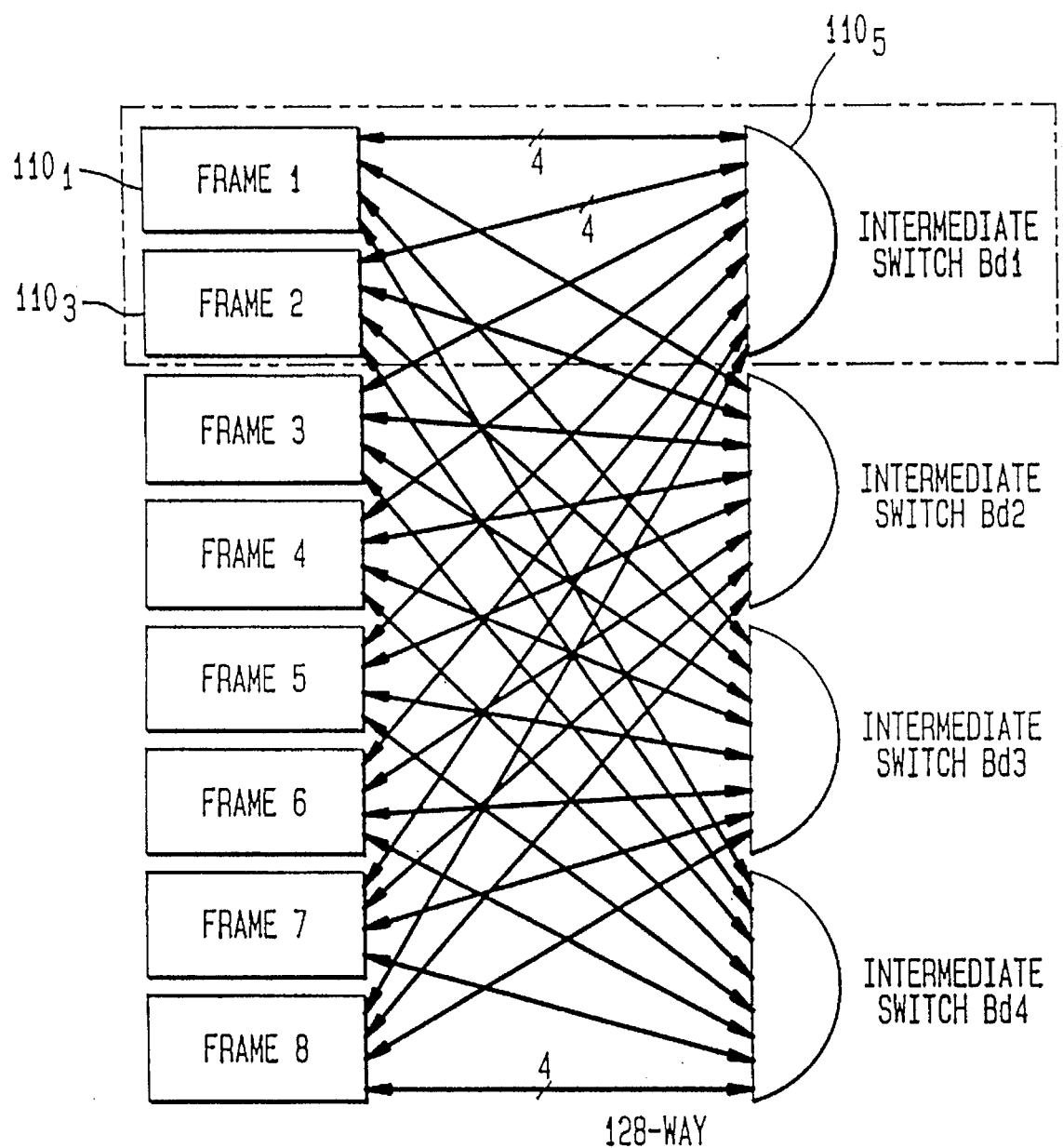
FIG. 7 is a 128 processor, parallel processing array incorporating pivot switch sets.

As can be seen in FIG. 7, the ball of wires problem persists in an array using pivot switches when the wiring between the clusters is haphazard. Wiring between the clusters should be as discussed in connection with FIG. 4. That is wires should be arranged along the row and column dimensions of a matrix. The four clusters of FIG. 7 can be arranged as a two by two array like the four clusters 24 in the upper lefthand corner in FIG. 4 or alternatively in a single column or row.

Although the invention has been described above with respect to certain embodiments thereof, it should be understood that it is not limited to application to those embodiments. For instance though the array of FIG. 4 is shown as being planar, it could be cylindrical or folded like a blanket to form a multi-layer array. Also in each of the illustrated embodiments there are two processor nodes and one pivot set in a cluster. The number of processor nodes can vary. Therefore it should be understood that these and other changes can be made without departing from the spirit and scope of the invention.

We claim:

1. In a scalable parallel processing network of processors in which the processors are arranged in a plurality of multi-processor nodes with each processor connected to all the other processors at that node through a node switch set and in which all node switch sets of the various processing nodes of the network are interconnected to connect every processor in the network to every other processor in the network for transfer of information therebetween, the improvement comprising:

a) a plurality of pivot switch sets in the scalable parallel processing network of processors, each such pivot switch set being connected to a plurality of the node switch sets in the scalable processing network of processors to form processor clusters including processors in each of the multi-processor nodes that are all connected to each other by the node and pivot switch sets in a cluster; and b) circuit means coupling said processor clusters in a matrix of multiple rows and columns with a grid of wires, said circuit means wiring all the node switch sets in the same row to each of the pivot switch sets in the other clusters in that row and all the node switch sets in the same column to all the pivot switch sets in other clusters in that column so that communication between processors in any two different clusters in the matrix is always through a pivot switch set, there being no direct processor node switch set to processor node switch set connections.

2. The scalable parallel processing network of claim 1 wherein said pivot switch sets each have the same number of output terminals as there are output terminals in the switch sets of the plurality processing in a processor cluster.

3. The scalable parallel processing network of claim 2 wherein communication between processors is in the form of packets.

4. In a massively parallel network of processors of the folded butterfly variety in which processors are arranged in a plurality of multi-processor nodes where each processor in a multiprocessor node is connected to other processors in that same multi-processor nodes through a node switch set and node switch sets of different nodes are connected together for the passage of messages therebetween, a method for interconnecting nodes comprising:

assigning a matrix row and column address to each of the multi-processor nodes of the massively parallel network of processors;

connecting the node switch sets in the multi-processor nodes at each column and row address to a pivot group of switches located at that row and column address to form a processor cluster at each row and column address where each of the processors at the row and column address is connected through a node switch set to the pivot group of switches at that address;

interconnecting, with a separate connection, a node switch set at each address location in each row to the pivot group of switches at each of the other address locations in that row; and interconnecting, with a separate interconnection, a node switch set at each address location in each column with each of the pivot groups of switches in processor clusters in the same column whereby there is one connection between any two processors at different row and column addresses in the massively parallel network of processors that is through only one pivot group.

5. In a scalable parallel processing network of processors of the folded butterfly variety in which the processors are arranged in a plurality of multi-processor nodes with each processor in a multi-processor node connected to all the other processors at that multi-processor node through a node switch set and in which all node switch sets of the various multi-processor nodes of the network are interconnected to connect every processor in the network to every other processor in the network for communication therebetween, the improvement comprising:

a) a plurality of pivot switch sets in said scalable parallel processing network, each such pivot switch set being connected to a plurality of node switch sets to form a plurality of processor clusters:

b) circuit means coupling the processor clusters in the scalable parallel processing network together by a grid of wires arranged in a matrix of multiple rows and columns with each processor cluster at the intersection of wires of one row and one column of the matrix, said circuit means wiring with separate connections a node switch set in each processor cluster of each row to each of the pivot switch sets in that row and wiring with separate connections a node switch set in each processor cluster in each column to all the pivot switch sets in that column with no direct node switch set to node switch set connections and no direct pivot switch set to pivot switch set connection and with each node switch set joined with each other node switch set in the matrix by one separate path containing one and only one pivot group set.

6. In a scalable parallel processing network of claim 5 wherein the separate connections to all the pivot switch sets in that same row are arranged in parallel along the logical axis of that row and all the separate connections to all the pivot switch sets in the same column are arranged in parallel along the logical axis of that column to provide an orderly arrangement of connections between clusters.

7. The scalable parallel processing network of claim 6 wherein said pivot switch sets each have the same number of output terminals as there are output terminals in the node switch sets of a processor cluster.

8. The scalable parallel processing network of claim 6 wherein there are two node switch sets in a cluster with each switch in a node switch set connected to a separate one of the switches in the pivot switch set and each of the switches in the pivot switch set which is connected to a switch in one of the node switch sets connected to all the switches in the pivot switch set that are connected to a switch in the other of the node switch sets.

9. The scalable parallel processing network of claim 8 wherein the pivot switch set in a cluster is connected to the processors of the cluster only through a node switch set in the cluster.

10. In a massively parallel, network of processors of the folded butterfly variety in which processors are arranged at the intersections of a matrix with a plurality of columns and rows where each processor in a multi-processor node is connected to other processors in that same multi-processor node through a node switch set and node switch sets of different multi-processor nodes in the network are interconnected for the passage of messages where between, comprising:

means connecting processor nodes at each column and row intersection in the massively parallel network of processors to a pivot group of switches located at that row and column intersection to form processor clusters with each of the processors at the row and column intersection connected to the pivot group of switches at that intersection;

means interconnecting a node switch set in each cluster to the pivot group of switches in each of the other processor clusters in the same row each with a separate interconnection arranged parallel to the logical axis of that row; and means interconnecting each node switch set in each cluster with each of the pivot groups of switches in the other processor clusters in the same column each with a separate interconnection arranged in parallel to the logical axis of that column whereby there is one connection between any two processors at different row and column locations through one pivot group by an orderly arrangement of interconnections.

11. In the massively parallel network of processors of claim 10 wherein the pivot switch set of the processors is only connected to processors through node switch sets.

* * * * *